Oct. 12, 1971   J. A. ISAACSON ET AL   3,611,682
MOWER MOUNTING LINKAGE

Filed Jan. 6, 1970   2 Sheets-Sheet 1

INVENTORS
JERROLD A. ISAACSON
ROBERT B. SWALLOW
ROSS M. LATHROP
BY John J. Kowalik
ATT'Y.

Oct. 12, 1971   J. A. ISAACSON ET AL   3,611,682
MOWER MOUNTING LINKAGE
Filed Jan. 6, 1970   2 Sheets-Sheet 2
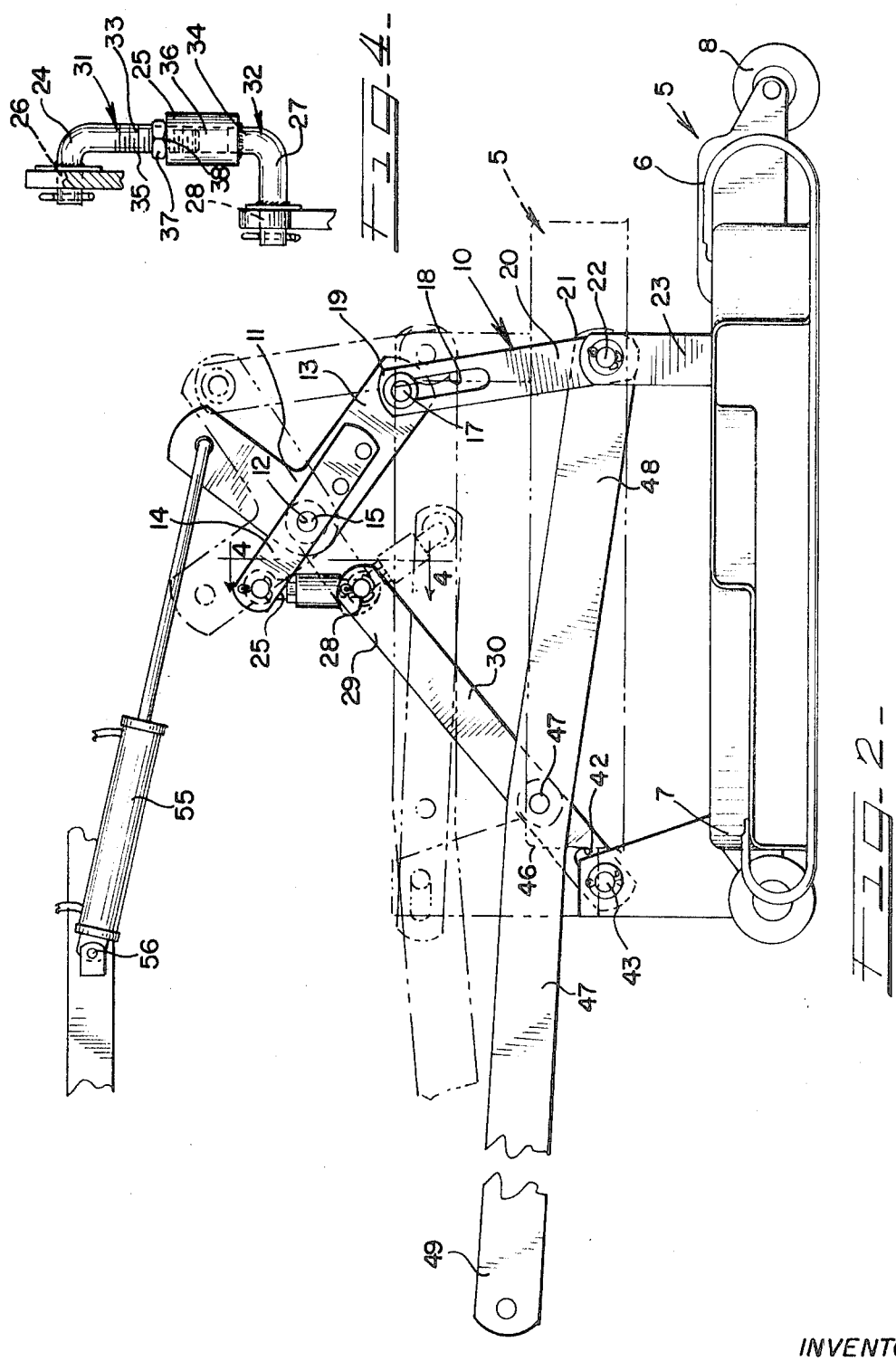
INVENTORS
JERROLD A. ISAACSON
ROBERT B. SWALLOW
ROSS M. LATHROP
BY John J. Kowalik
ATT'Y.

3,611,682
MOWER MOUNTING LINKAGE
Jerrold A. Isaacson, Lombard, Robert B. Swallow, Oaklawn, and Ross M. Lathrop, Downers Grove, Ill., assignors to International Harvester Company, Chicago, Ill.
Filed Jan. 6, 1970, Ser. No. 999
Int. Cl. A01d 35/26
U.S. Cl. 56—14.9                                             10 Claims

ABSTRACT OF THE DISCLOSURE

Self-leveling linkage which is effective to position a mower from the underside of a tractor by means of a single rockshaft generally parallel with the ground. The linkage comprises front and rear lift links connected at their upper ends to opposite ends of a libratory lever which is connected intermediate its ends to the rockshaft. The lower ends of the lift links are connected to the front and rear ends of the mower and the rear links are pivoted intermediate their ends to a pair of draft links intermediate their ends. The draft links are pivoted at their forward ends to the forward end of the mower coaxial with the lower ends of the front lift links and extend over the mower and have rear end portions pivoted to the tractor behind the mower. The amount of lift of the front of the mower by the front links is concurrently equalized by the linkage in lifting the rear end of the mower.

DESCRIPTION OF THE PRIOR ART

In the prior art devices various types of linkages had been employed for the purpose of lifting and lowering mowers. In general these linkages required a pair of rockshafts mounted beneath an ambulatory support such as a tractor and each of these rockshafts carried lifting arms which in turn were connected by means of linkage to the front and rear of the mower. The provision of dual rockshafts necessitates providing sets of lifting arms as well as linkage for coordinating the movements of the two rockshafts so that they would operate in unison. In structures where there is limited space such arrangement of rockshafts is not feasible and the necessary interconnecting linkage could not be accommodated.

SUMMARY OF THE INVENTION

This invention is directed to a novel lifting mechanism for a mower which is mounted from a single rockshaft and wherein a linkage is provided for maintaining the mower substantially parallel with the ground irrespective of its elevation by the lifting linkage.

The general object of the invention is to provide a novel mower mounting linkage in which the mower is connected to a stabilizing linkage or guide linkage at one end, the guide linkage being pivoted to the tractor at the opposite end and lifting links being connected to the mower adjacent to the connection of the guide links, and the linkage being provided such that as the front of the mower swings about the pivot of the guide links to the tractor the other end of the mower is proportionately elevated or lowered in order to maintain the mower substantially parallel with the ground.

A more specific object of the invention involves the provision of a novel libratory lever means connected to the rockshaft mounted on the tractor, one end of the lever being connected to the lift links and the other end of the lever being connected to a compensatory linkage which serves to appropriately lift or lower the opposite end of the mower in conjunction with the lifting and lowering of the end of the mower which the lift links are connected so as to maintain the mower in substantially horizontal position.

A still further object of the invention is to provide such a novel linkage which accommodates floating of the mower over the terrain.

These and other objects and advantages inherent in and encompassed by the invention will become more apparent from the specification and the drawings wherein:

FIG. 2 is a perspective view of the structure shown in FIG. 1;

FIG. 4 is an enlarged fragmentary section taken substantially on line 4—4 of FIG. 2.

DESCRIPTION OF THE INVENTION

Figure 1:
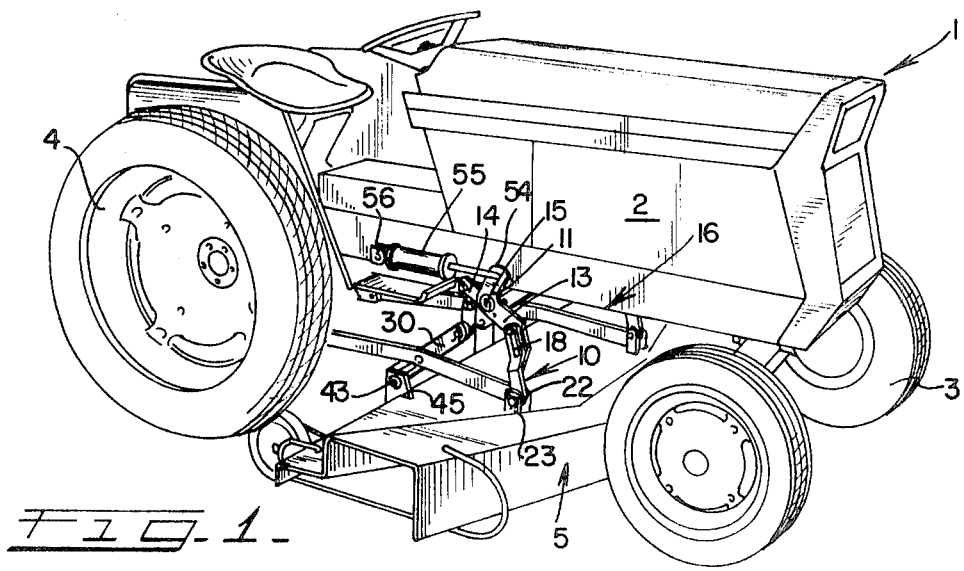
FIG. 1 is a side elevational view illustrating the novel mounting linkage in association with the mower and the tractor.
Figure 3:
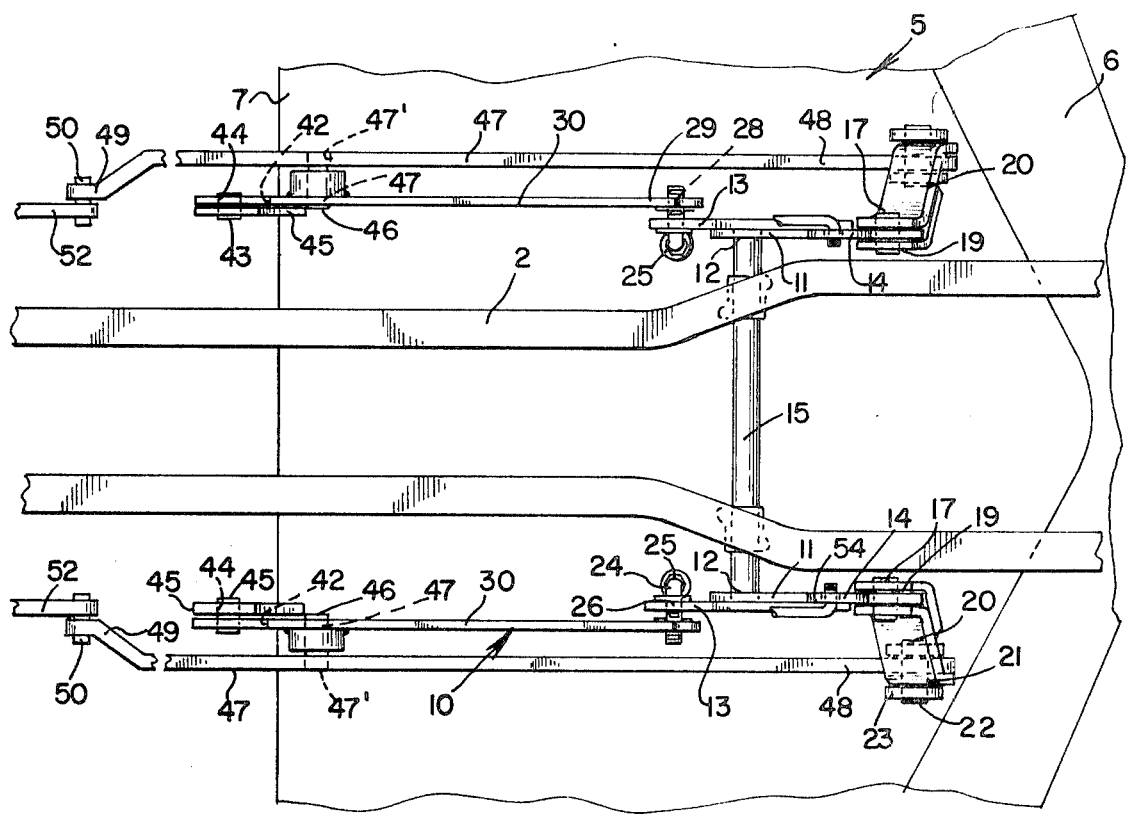
FIG. 3 is an end view of the linkage shown in association with the mower.

The invention as shown in association with a tractor generally designated 1 which has a longitudinal body 2, front steering wheels 3 and a rear traction wheel axle assembly 4. The mower 5 which may be of any conventional design comprises a front portion 6 and a rear portion 7, the front portion 6 mounting intermediate the lateral sides of the mower a forwardly directed roller 8 which is adapted to engage and ride over elevated terrain to prevent scalping.

The mower is supported from the tractor by means of novel lift and lowering linkage generally designated 10. Inasmuch as the linkage 10 is the same on both sides of the tractor the same parts will be identified with the same numerals. Each linkage 10 comprises a libratory level 11 which is connected as at 12 intermediate its front and rear portions 13 and 14 to a rockshaft 15 which is suitably journaled under the waist portion 16 of the tractor. The forward end of the front leg 13 of lever 11 is provided with a substantially horizontal transverse pivot 17 which is parallel with the pivot axis of the shaft 12 and the pivot 17 which may be in the nature of a pin extends through a vertically elongated slot 18 in the upper end 19 of the forward lift links 20. The slot and pin connections 17, 18 provide a lost motion or floating connection. The lower ends 21 of the links 20 are pivotally connected to a pin 22 which is parallel with the pin 17 and which is connected to upstanding ear structure 23 adjacent to the respective side of the mower.

The rear leg 14 is connected to the upper end 24 of an adjusting link 25 as at 26 (FIG. 4), the lower end 27 of said link being pivotally connected as at 28 to the upper end 29 of the rear lifting link 30.

As best seen in FIG. 4 the link 25 comprises upper and lower L-shaped portions 31 and 32 with vertically aligned coaxial legs 33 and 34, the leg 33 being threaded as at 35 and having a threaded connection with a threaded nut 36 which is connected to the upper end of the leg 34. A lock nut 37 is threaded on the portion 35 of leg 33 such that after the legs 31 and 32 are suitably adjusted through interthreading of the parts 35 and 36 the lock nut 37 is then threaded down and locked against the surface 38 at the upper end of the nut 36. The portion 24 of the upper element 31 forms the pivot 26 and the portion 27 forms the pivot 28.

The link 30 slopes downwardly and rearwardly and at its lower end is provided with a longitudinally elongated slot 42 which receives the pin 43 therethrough. Pin 43 extends through an associated opening 44 in an upstanding lug 45 which is connected to the rear portion 7 of the mower adjacent to the respective side thereof.

The link 30 is pivotally connected intermediate its ends as by pin 46 to a draft link 47 intermediate its ends as at 47'. Link 47 extends over the mower and has a forward end portion 48 which is pivoted on the pin 22. The rear end portion 49 of each link 47 is pivoted on a substantially horizontal axis on a pin 50 to a depending bracket or lug structure 52 which is suitably connected to the tractor.

OPERATION OF THE DEVICE

Assuming that the linkage is as shown in FIG. 1 which is the lowest position of the mower, it will be observed that the mower is accommodated vertical movement by the knee joint connection between the link 25 and the link 30 and also because of the slot 42 in the lower end of the link 30 and also because of the slot 18 in the links 20. Observe that the slot 42 and pin 43 define a lost motion connection. Thus the mower is adapted to have limited movement vertically sufficient to accommodate traverse of the mower over uneven terrain. The libratory lever 11 has a vertically extending arm 54 connected to a hydraulic ram 55 which in turn is connected as of 56 to the tractor. In order to lift the mower the ram 55 is contracted to rotate lever 11 in a counterclockwise direction. This action causes the leg 13 to rise which in turn raises the forward end of the mower as well as the draft links 47. As the leg 13 of lever 11 swings upwardly, the leg 14 swings downwardly and through the link 25, the link 30 is caused to rotate in a clockwise direction thereby lifting the rear portion 7 of the mower at rate substantially comparable to the concurrent movement of the portion 6 of the mower. Thus the mower is maintained substantially horizontal or parallel to the ground. This action continues until the mower is lifted to its uppermost transport position as seen in phantom lines in FIG. 1.

Rotating the lever 11 in a clockwise direction verses all the aforementioned movements and as the forward end of the mower moves downwardly the rear end is also comparably moved downwardly so that in effect the mower is pivoting about the front pivot 22 as the entire assembly is pivoting about the pivot 50.

Thus a novel, simple and effective mounting linkage is readily adjustable and allows float of the mower and maintains the mower substantially horizontal in all operating positions thereof all from a single rockshaft mounting.

What is claimed is:

1. In a self-leveling mounting for a mower having first and second end portions from an ambulatory support, lifting and lowering libratory lever means pivotally mounted intermediate the ends thereof on the support and having first and second ends, first and second lift link means having upper ends operatively connected with the first and second ends of said libratory lever means respectively, means operatively respectively connecting the lower ends of said first and second link means to the first and second end portions of the mower, draft link means having first ends operatively connected to the first end of the mower and pivotally connected intermediate the ends thereof to said second link means intermediate the end thereof, and said draft link means having second ends swingably connected to the support, the effective axes of connection of said lever means and link means being substantially parallel.

2. The invention according to claim 1 and said operative connection between the upper ends of the second lift link means and said libratory lever means comprising adjustable links pivotally connected at one end to the second end of the libratory lever means and at their other ends to said upper ends of the second link means.

3. The invention according to claim 1 and the connecting means between the lower ends of the second link lift means and the mower comprising lost-motion means.

4. The invention according to claim 1 and the operative connection between the upper ends of the second lift link means and said libratory lever means comprising adjustable links pivotally connected at one end to the rear end of the libratory lever means and at their other ends to said upper ends of the second lift link means, and the connecting means of the lower ends of the second lift link means and the mower comprising lost-motion means.

5. The invention according to claim 1 and the operative connection of the upper ends of the first lift link means comprising lost-motion means.

6. The invention according to claim 1 and the operative connections of the lower ends of the first lift link means and the first ends of the draft link means to the mower comprising coaxial pivots.

7. The invention according to claim 4 and the operative connections of the upper ends of the first link means comprising lost-motion means.

8. The invention according to claim 7 and the operative connections of the lower ends of the first lift link means and the first ends of the draft link means to the mower comprising coaxial pivots.

9. The invention according to claim 1 and said libratory lever means comprising a transverse extension including means for connection to a powered operating means.

10. The invention according to claim 1 and said lever means and link means being symmetrically disposed at opposite sides of the mower in laterally balanced suspending relation thereto from the support.

References Cited

UNITED STATES PATENTS

| | | | |
|---|---|---|---|
| 3,269,100 | 8/1966 | Smith | 56—25.4 |
| 3,283,486 | 11/1966 | Marek et al. | 56—24.4 |
| 3,357,165 | 12/1967 | Thun | 56—25.4 |
| 3,408,798 | 11/1968 | Hale et al. | 56—25.4 |
| 3,450,211 | 6/1969 | Becker et al. | 56—24.4 X |
| 3,512,344 | 5/1970 | Kortum | 56—25.4 |

LOUIS G. MANCENE, Primary Examiner

D. L. WEINHOLD, Jr., Assistant Examiner